United States Patent [19]

Ikawa

[11] 4,270,079

[45] May 26, 1981

[54] FLASH DEVICE

[75] Inventor: Kazuo Ikawa, Yokohama, Japan

[73] Assignee: Canon Kabushiki Kaisha, Tokyo, Japan

[21] Appl. No.: 46,036

[22] Filed: Jun. 6, 1979

[30] Foreign Application Priority Data

Jun. 14, 1978 [JP] Japan .................................. 53-71860

[51] Int. Cl.[3] ........................ H02J 15/00; H05B 41/32

[52] U.S. Cl. ...................................... 320/1; 315/241 P

[58] Field of Search .......................... 320/1; 315/241 P

[56] References Cited

U.S. PATENT DOCUMENTS

| | | | |
|---|---|---|---|
| 3,780,344 | 12/1973 | Paget | 315/241 P |
| 3,819,983 | 6/1974 | Bjork | 315/241 P |
| 3,828,222 | 8/1974 | Mason | 315/241 P |
| 3,859,582 | 1/1975 | Kautz et al. | 320/1 |
| 4,034,278 | 5/1977 | Gahler et al. | 315/241 P |

*Primary Examiner*—Stuart N. Hecker

*Attorney, Agent, or Firm*—Toren, McGeady and Stanger

[57] ABSTRACT

In the flash device disclosed, a control circuit for controlling the charging operation of a main capacitor is provided with a switching means for forming a path for charging the main capacitor; and a signal forming circuit which produces opening and closing signals for control over the switching means. The switching means is alternately opened and closed by the opening and closing signals to intermittently charge the main capacitor. When the main capacitor is completely charged, the signal forming means produces only the closing signal causing the switching means to cyclically block the charging path. Thus, even if the switching means is subject to operation by a noise which further charges the main capacitor after the charging operation has been completed, this further charging can be immediately stopped. Thus, the main capacitor does not become overcharged.

8 Claims, 1 Drawing Figure

FLASH DEVICE

BACKGROUND OF THE INVENTION

1. Field of the Invention

This invention relates to a flash unit in which light is emitted by discharging electrical energy accumulated at a main capacitor to a discharge tube, and more particularly to a power source circuit which is provided in the flash device for charging the main capacitor with a predetermined value of electrical energy.

2. Description of the Prior Art

Commonly, a power source circuit for a flash unit is arranged such that a switching element, e.g. a thyristor or the like, is connected between a battery and a main capacitor to charge the latter with electric energy. When the charge voltage of the main capacitor reaches a predetermined voltage value required for light emission by a discharge tube, a signal for making the switching element conductive is removed to make it nonconductive. Thus, the main capacitor is charging operation is stopped so that it is charged up to the predetermined value. In the conventional power source circuit of this type, this operation stops when the charge voltage of the main capacitor reaches the predetermined value. After that, however, the switching element may to be turned on again by noise or the like. This causes the main capacitor to be further charged. Thus, the main capacitor is occasionally damaged by overcharging.

SUMMARY OF THE INVENTION

It is an object of the invention to provide a power source circuit for a flash unit which is capable of keeping the voltage of a main capacitor at a predetermined value to prevent damage from overcharge, even in the presence of noises, etc.

To this end, the power source circuit is provided with a switching means which forms a charging path to the main capacitor, and a signal forming circuit which produces on and off signals to alternately open and close the switching means. Also provided is a control means which extinguishes the on signal and allows only the off signal to be produced when the main capacitor is charged to a predetermined voltage value. After the main capacitor has been completely charged, only an off signal is impressed on the switching means at predetermined intervals to immediately render the switching element of the switching means nonconductive, even when a noise happens to turn the switching element on again. Thus, the main capacitor is prevented from being overcharged.

The object, features and advantages of the invention will become apparent from the following description of a preferred embodiment in connection with the accompanying drawing.

DESCRIPTION OF THE PREFERRED EMBODIMENT

Figure 1:
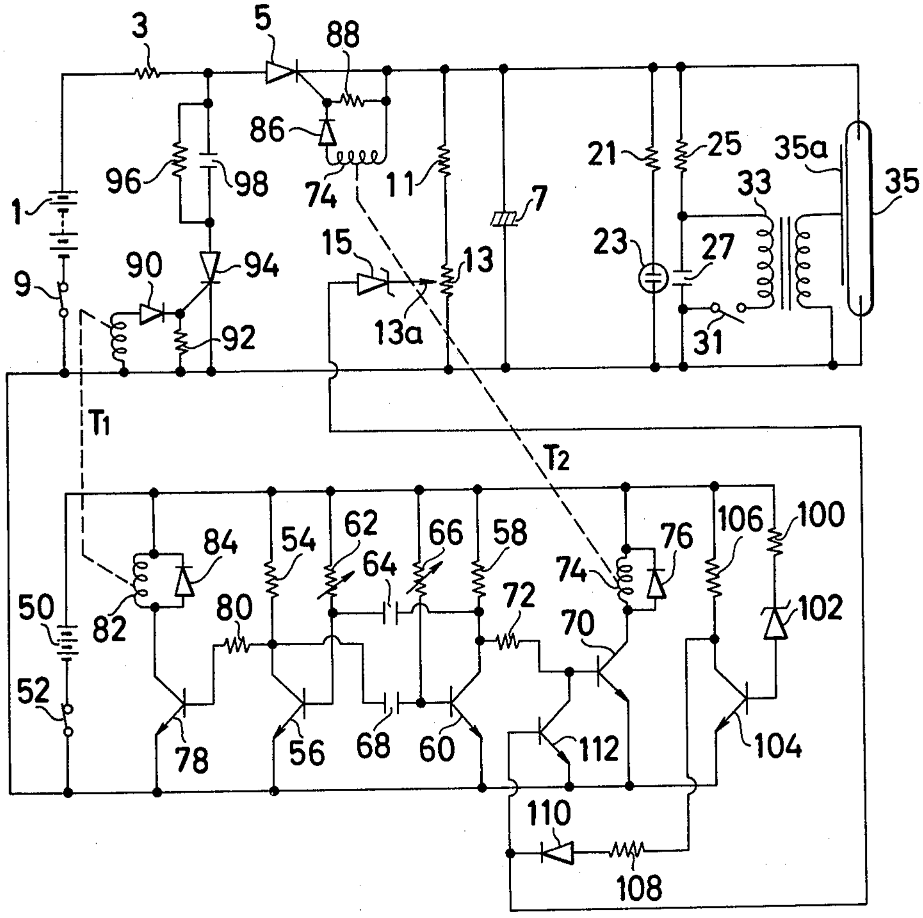
FIG. 1 is a circuit diagram showing a flash unit as preferred embodiment of the present invention.

Referring to FIG. 1, which shows a circuit diagram of an embodiment of the flash unit. A layer built cell 1 supplies electric energy to a main capacitor 7 through a resistor 3, a thyristor 5 and a normally open type power source switch 9. A detection circuit which detects the charge voltage of the main capacitor is composed of resistors 11 and 13 which are connected in parallel to the main capacitor to form a voltage dividing circuit, and a Zenor diode 15 which is connected to the resistor 13 through a sliding piece 13*a*. A neon tube 23 is connected in parallel with the main capacitor through a resistor 21 to display completion of a charging operation. Reference numeral 25 indicates a resistor and 27 indicates a trigger capacitor which forms a trigger circuit. A trigger transformer 33 is connected in parallel with the trigger capacitor 27 through a normally open switch 31. One end of the secondary winding of the trigger transformer 33 is connected to a trigger electrode 35*a* of a discharge tube 35 and the other end to the cathode of the discharge tube 35.

An astable multivibrator composed of elements 54–68 is connected to a battery 50 through a normally open type power source switch 52. The multivibrator is of a known type, composed of a collector resistor 54 connected to the collector of an npn transistor 56; a resistor 62 connected to the base of the transistor 56; and a capacitor 64 which is connected to the resistor 62. Also included in the multivibrator are a collector resistor 58 connected to the collector of an npn transistor 60; a resistor 66 connected to the base of the transistor 60; and a capacitor 68 connected to the resistor 66 and to the base of the transistor 60.

An npn transistor 70 forms a first output stage, and its base of the transistor 70 is connected to the collector of the transistor 60 through a base resistor 72. The collector of the transistor 70 is connected to the positive electrode of the battery through a pulse transformer 74. A noise preventing diode 76 has its cathode connected to the positive electrode of the battery 50 while its anode is connected to the collector of the transistor 70.

An npn transistor 78 forms a control signal supply means jointly with the multivibrator, the transistor 70 and a transistor 112. In addition to this, the transistor 78 also forms a second output stage. The base of this transistor 78 is connected through a resistor 80 to the collector of the transistor 56, which serves as output terminal for the astable multivibrator. The collector of the transistor 78 is connected to the positive electrode of the battery 50 through the primary winding of a pulse transformer 82. A noise preventing diode 84 is connected in parallel with the pulse transformer 82. The secondary winding of the other pulse transformer 74 is connected in parallel with a resistor 88 through a diode 86 while the secondary winding of the pulse transformer 82 is connected to a resistor 92 through a diode 90. The resistor 92 is connected between the gate and the cathode of a thyristor 94, which forms a second switching element, while the anode of the thyristor 94 is connected to the positive electrode of the layer built cell 1 through a resistor 96 and the resistor 3. The resistor 96 which is connected in parallel with a capacitor 98 has a resistance value suitable for allowing a current less than the holding current of the thyristor 94 to flow to the thyristor 94. A Zener diode 102 for checking the output voltage of the battery 50 is connected to the positive electrode of the latter through a resistor 100. The anode of the Zener diode 102 is connected to the base of an npn transistor 104, which is provided for switching. A collector resistor 106 is connected to the collector of the transistor 104. A diode 110 is connected to the collector of the transistor 104 through a resistor 108. The cathode of the diode 110 is connected to the base of the npn transistor 112, which is arranged to shortcircuit between the base and emitter of the transistor 70. The flash device operates in the following manner:

When the astable multivibrator oscillates with the power source switches 9 and 52 closed, the output pulses of the multivibrator alternately render the transistors 70 and 78 conductive. Assuming that the transistor 60 is non-conductive, the transistor 70 is rendered conductive. This situation causes a current to flow suddenly to the primary winding of the transformer 74 and generate pulses in the secondary winding thereof. The pulses generated at the transformer 74 render the thyristor 5 conductive to permit supply of current from the cell 1 to the main capacitor 7 through the resistor 3. The thyristor 5 and the main capacitor 7 thus begins to charge. Following this, when the transistor 60 is turned conductive after a given length of time determined by the capacitance of the capacitor 68 and resistance of the resistor, the transistor 56 turns nonconductive. When the transistor 78 then turns conductive, a current suddenly flows to the primary winding of the transformer 82 and generates pulses in the secondary winding thereof. The thyristor 94 is then triggered by the pulses generated in the secondary winding of transformer 82.

Therefore, in the initial stage of pulse generation, a current flows to the thyristor 94 through the resistor 3 and the capacitor 98. The thyristor 94 thus becomes conductive. In this state, when a potential on the anode of the thyristor 94 becomes equal to a potential on the cathode, i.e. when it comes close to a reference potential (a zero level), the electric charge accumulated at the main capacitor 7 while the thyristor 5 is in a conductive state causes a potential on the cathode of the thyristor 5 to become higher than a potential on its anode. Therefore, a reverse voltage is impressed between the anode and the cathode of the thyristor 5. At this time, when a reverse voltage is impressed between the anode and the cathode of the thyristor 5, no forward bias voltage is impressed between the gate and the cathode of the thyristor 5, because the transistor 70 is in a nonconductive state. Therefore, impression of the voltage in the reverse direction between the anode and the cathode of the thyristor 5 immediately turns the thyristor 5 nonconductive. This causes a charging operation on the main capacitor 7 to be held in abeyance.

After a given length of time determined by the resistor 62 and the capacitor 64, when the transistor 56 of the astable multivibrator becomes conductive and the transistors 78 and 60 nonconductive, the bias voltage between the gate and the cathode of the thyristor 94 is removed. Meanwhile, the pulses generated at the transformer 74 cause a bias voltage to be impressed on the thyristor 5, as mentioned. With the voltage between the gate and cathode of the thyristor 94 removed, the resistor 96 causes a current less than the holding current to flow to the thyristor 94 and the latter is immediately rendered nonconductive. Thus, the thyristor 5 is turned conductive to permit resumption of the charging of the main capacitor 7.

The values of the resistors 62 and 66 and those of the capacitors 64 and 68 are set to ensure that the length of time during which the transistor 70 remains conductive is sufficiently longer than the length of time during which the transistor 78 remains conductive. Therefore, the charge voltage of the main capacitor 7 gradually increases as the opening and closing actions of the thyristors 5 and 94 are repeated by the output pulses of the astable multivibrator. When the terminal voltage of the main capacitor 7 reaches a voltage value at which light emission can be effected by the discharge tube 35, the neon tube 23 lights up to let the operator know that the main capacitor 7 has been charged. Further, when the terminal voltage of the main capacitor 7 reaches the predetermined voltage value, the voltage at the point of the sliding piece 13*a* of the resistor 13 comes to exceed the Zener voltage of the Zener diode 15 to make the transistor 112 conductive. In this manner, the transistor 112 remains conductive even if the transistor 60 of the astable multivibrator becomes nonconductive after that. The transistor 112 thus shortcircuits the base and the emitter of the transistor 70 forcibly keeping it in a nonconductive state. With the transistor 70 nonconductive, no triggering pulse is impressed on the gate of the thyristor 5. After completion of a charging operation of the main capacitor, even if the transistor 60 of the astable multivibrator turns nonconductive so that the output pulses of the multivibrator attempt to make the thyristor 5 conductive, the thyristor 5 will not become conductive. Thus, the charging operation of the main capacitor 7 is stopped when the predetermined value is reached. On the other hand, while the charge voltage of the main capacitor 7 has reached the predetermined value and the transistor 112 is forcibly keeping the transistor 70 in the nonconductive state, the output pulses of the astable multivibrator still cause the transistor 78 to repeatedly alternate between conductive and nonconductive states. This in turn causes the thyristor 94 to repeatedly become conductive and non-conductive in synchronism with the transistor 78.

Therefore, even if a voltage is impressed on the gate of the thyristor 5 by a noise to turn the thyristor 5 conductive again, another thyristor 94 becomes conductive, after the thyristor 5, to impress a reverse voltage between the anode and the cathodes of the thyristor 5. This makes the thyristor 5 nonconductive, as mentioned in the foregoing, to prevent the main capacitor 7 from being further charged and thus from being damaged by overcharge.

When the output voltage of the battery 50, which drives the astable multivibrator, becomes lower than the Zener voltage of the Zener diode 102 to turn the transistor 104 nonconductive, a base current flows to the base of the transistor 112 through the resistors 106 and 108 and the diode 110. Then, the transistor 112 becomes conductive in the same manner as when the charge voltage of the main capacitor 7 reaches the predetermined value. This stops control over the thyristor 5 by the output pulses of the astable multivibrator, and in turn stops the main capacitor 7 from being charged at this time. With the output voltage of the battery 50 becoming lower to stop the oscillation of the astable multivibrator, a voltage is no longer impressed on the gate of the thyristor 94. Thyristor 94 is thus kept nonconductive in the same manner as the other thyristor 5.

When the switch 31 is closed after the main capacitor 7 is charged to the predetermined voltage value, the electric charge accumulated in the capacitor 27 during the charging period of the main capacitor 7 is discharged through the primary winding of the trigger transformer 33 and the closed switch 31. The discharge tube 35 is triggered by a pulse produced by this discharge at the secondary winding of the trigger transformer 33 and emits a flash corresponding to the electric charge accumulated at the main capacitor 7.

In accordance with this invention, the astable multivibrator continues to intermittently supply a signal for closing the thyristor 94 even after the thyristor 5 becomes nonconductive with the charge voltage of the main capacitor 7 having reached the predetermined value. Hence, even if the thyristor 5 is rendered conductive by a noise or the like, the main capacitor 7 is prevented from being overcharged. Therefore, damage to a main capacitor which occasionally occurs in such a case is effectively prevented in accordance with the present invention.

Further, in accordance with the present invention, when the astable multivibrator is stopped from oscillating, the thyristor 5 is rendered nonconductive, always prior to the thyristor 94, to stop the main capacitor from being charged. Therefore, even if the oscillation of astable multivibrator is inadvertently stopped by deterioration of the battery, etc., there is no possibility that the main capacitor 7 will be damaged by overcharge.

When the charge voltage of the main capacitor is lower than the predetermined value, an opening signal and a closing signal are alternately impressed on the above stated switching element. When the charge voltage of the main capacitor reaches the predetermined value, the closing signal is removed. In accordance with this arrangement of the invention, therefore, even if a noise or the like causes the switching element to change from a conductive state to a nonconductive state, the switching element is immediately rendered conductive by a next closing signal and is never kept in the nonconductive state. Therefore, a charging operation on the main capacitor will never be interrupted by noise or the like. Further, in accordance with the invention, the speed of charging the main capacitor can be changed to a desired speed by adjusting the resistor 62 or 66. The time required for charging the main capacitor can be prolonged to a desired length to prevent the main capacitor from being damaged by charging it at an excessively high speed.

What is claimed is:

1. A flash device comprising:
(a) a power supply source;
(b) a capacitor for accumulation of a flashing energy;
(c) a switching means for forming and blocking a power supply path leading to said capacitor;
(d) a detection circuit for detecting the charged status of said capacitor, said detection circuit being arranged to produce a signal when said capacitor is charged up to a predetermined voltage value; and
(e) a control circuit which alternately produces signals for causing said switching means to perform forming and blocking control over said power supply path, said control circuit being arranged to produce only the signal which causes said switching means to block said power supply path in response to the signal produced by said detection circuit.

2. A flash device comprising:
(a) a power supply source;
(b) a capacitor for accumulation of a flashing energy;
(c) a switching means connected to said power supply source and to said capacitor, said switching means being arranged to form a power supply path leading to said capacitor when it closes and to block said power supply path when it opens;
(d) a detection circuit for detecting the charged status of said capacitor, said detection circuit being arranged to produce a signal when said capacitor is charged up to a predetermined voltage value; and
(e) a control circuit which alternately produces an opening signal for opening said switching means and a closing signal for closing said switching means, said control circuit being arranged to produce only said opening signal in response to the signal from said detection circuit.

3. A flash device according to claim 2, wherein said control circuit is provided with a first output means for producing said opening signal, a second output means for producing said closing signal and also an inhibiting means for rendering said second output means inoperative, said inhibiting means being arranged to operate in response to the signal from said detection circuit.

4. A flash device comprising:
(a) a power supply source;
(b) a capacitor for accumulation of a flashing energy;
(c) a switching means connected between said capacitor and said power supply source, said switching means being arranged to form a power supply path leading to said capacitor in response to a first signal and to block said power supply path in response to a second signal;
(d) a control circuit which alternately produces said first and second signals, said control circuit having an oscillation circuit, a first output means which is connected to said oscillation circuit and arranged to produce said first signal and a second output means which is arranged to produce said second signal;
(e) a detection circuit for detecting the charged status of said capacitor, said detection circuit being arranged to produce a signal when said capacitor is charged up to a predetermined voltage value; and p1 (f) an inhibiting means which operates in response to the signal from said detection circuit to render said first output means inoperative.

5. A flash device according to claim 4 further comprising:
(a) a second power supply source which is provided for operating said control circuit; and
(b) a second detection circuit which detects the voltage of said second power supply source, said circuit being arranged to produce a signal when the voltage of said second power supply source becomes lower than a predetermined voltage level, said inhibiting means being arranged to operate in response to the signal produced by said second detection circuit.

6. A flash device comprising:
(a) a power supply source;
(b) a capacitor for accumulation of a flashing energy;
(c) a signal forming circuit which forms opening and closing signals in a predetermined duty ratio;
(d) a switching means which forms a power supply path leading to said capacitor in response to said opening signal and blocks said power supply path in response to said closing signal, said switching means being arranged to have said capacitor charged in accordance with the duty ratio between said opening and closing signals produced by said signal forming circuit; and p1 (e) a varying means which permits adjustment of said duty ratio.

7. A flash device comprising:
(a) a power supply source;
(b) a capacitor for accumulation of a flashing energy;
(c) a semiconductor switching means connected between said power supply source and said capacitor;
(d) a detection circuit for detecting the charged status of said capacitor, said detection circuit being arranged to produce a signal when said capacitor is charged up to a predetermined voltage value;

(e) an oscillation circuit having first and second output terminals to alternately produce an opening signal from said first output terminal and a closing signal from said second output terminal, said semiconductor switching means being arranged to become conductive in response to said opening signal and to become nonconductive in response to said closing signal; and (f) a second semiconductor switching means which cuts off the opening signal from said first output terminal in response to the signal from said detection circuit.

8. A flash device according to claim 7, wherein said oscillation circuit is astable multivibrator.

* * * * *